United States Patent [19]

Ando

[11] Patent Number: 4,478,492
[45] Date of Patent: Oct. 23, 1984

[54] OPTICAL DEVICE WITH BAYONET MOUNT AND POSITION RESTRICTION MEANS

[75] Inventor: Makoto Ando, Sakai, Japan
[73] Assignee: Minolta Camera Kabushiki Kaisha, Osaka, Japan
[21] Appl. No.: 442,926
[22] Filed: Nov. 18, 1982

[30] Foreign Application Priority Data

Nov. 18, 1981 [JP] Japan .................. 56-183864
Nov. 18, 1981 [JP] Japan .................. 56-183865

[51] Int. Cl.$^3$ .............................. G02B 7/02
[52] U.S. Cl. ................................. 350/257
[58] Field of Search ............... 350/257, 252; 354/286

[56] References Cited

U.S. PATENT DOCUMENTS

| 2,881,684 | 4/1959 | Brohl et al. | 354/286 |
| 3,620,149 | 11/1971 | Ogihara | 354/286 |
| 4,017,878 | 4/1977 | Hagiwara | 354/286 |
| 4,201,462 | 5/1980 | Uno et al. | 354/289 |
| 4,299,470 | 11/1981 | Shimizu | 350/252 |
| 4,322,154 | 3/1982 | Hashimoto | 350/257 |
| 4,326,788 | 4/1982 | Ohmori et al. | 354/286 |

FOREIGN PATENT DOCUMENTS

| 557255 | 5/1958 | Canada | 350/252 |
| 2131881 | 2/1980 | Fed. Rep. of Germany | 354/286 |
| 53-50420 | 12/1978 | Japan . | |
| 56-47526 | 4/1981 | Japan . | |

OTHER PUBLICATIONS

Minolta 1969 Part's list for SRT101.

Primary Examiner—William H. Punter
Attorney, Agent, or Firm—Wolder, Gross & Yavner

[57] ABSTRACT

Optical devices such as a camera body and an interchangeable lens coupled to complementary optical devices by a bayonet coupling allow interchange of the complementary optical devices independently of whether or not the type of position restriction thereof matches with that of the complementary optical devices. In an embodiment of a camera body, both a radially inwardly operating type position restricting member and an optical axis direction operating type position restricting member are provided together with a position restriction release button. The camera body is also provided with a mechanism which gives priority to the optical axis direction operating type position restriction over the radially inwardly operating type position restriction when an interchangeable lens which includes both a position restriction recess for the radially inwardly operating type position restriction and a position restriction recess for the optical axis direction operating type position restriction is coupled to the camera body.

14 Claims, 33 Drawing Figures

OPTICAL DEVICE WITH BAYONET MOUNT AND POSITION RESTRICTION MEANS

BACKGROUND OF THE INVENTION

1. Field of the Invention

The present invention relates to an optical device or instrument with a bayonet mount coupling and position restriction means.

2. Description of the Prior Art

The bayonet mount coupling provides an advantage that an optical device with a bayonet mount can be attached to another complementary optical device with a compensating bayonet mount, with little relative rotation. However, the bayonet mount coupling is provided with a position restricting means because the coupling between the devices will be unstable if their relative angular positions are not restricted.

Heretofore, there have been known two types of the position restricting means. One of them is of the radially inwardly operating type, while the other is of the optical axis direction operating type. In each position restriction type, some kinds of optical device may be made interchangeable with one another by standardizing the configurations, structures and the like of their coupling portions insofar as they are of the same position restriction type. However, interchangeability could not be expected between optical devices whose position restriction type is different from each other. That is, an optical device of one position restriction type could not be coupled with an optical device of the other position restriction type. Thus, adaptability has been limited for two complementary optical devices to be used in coupled relationship with each other, e.g. an interchangeable lens and a camera body.

SUMMARY OF THE INVENTION

An object of the present invention is to provide an optical device which is coupled by a bayonet mount coupling to a complementary optical device having a first position restriction recess for the radially inwardly operating type position restriction and/or a second position restriction recess for the optical axis direction operating type position restriction.

Another object of the present invention is to provide an optical device which is coupled by a bayonet coupling to a complementary optical device having a first position restriction member for the radially inwardly operating type position restriction and/or a second position restriction member for the optical axis direction operating type position restriction.

According to the present invention, an optical which is coupled by a bayonet mount to a complementary optical device having the first position restriction recess for the radially inwardly operating type position restriction and/or the second position recess for the optical axis direction operating type position restriction includes first and second position restriction members and a position restriction release means. The first position restriction member is biased by a first biasing means to operate radially inwardly from an inoperative position to an operative position for restriction of the angular position of the complementary optical device relative to the optical device. It can assume the operative position only when it enters the first position restriction recess for the radially inwardly operating type position restriction. The second position restriction member is biased by a second biasing means to operate in the direction of the optical axis of the optical device from an inoperative position to an operative position for restriction of the angular position of the complementary optical device relative to the optical device. It can assume the operative position only when it enters the second position restriction recess for the optical axis direction operating type position restriction. The position restriction release means is arranged to be operated by an external operation to retract the first and second position restriction members from their operative positions.

An optical device which is coupled by a bayonet coupling to a complementary optical device having the first position restriction member for the radially inwardly operating type position restriction and/or the second position restriction member for the optical axis direction operating type position restriction includes first and second position restriction recesses which are arranged to receive the first and second position restriction members for restriction of the angular position of the optical device relative to the complementary optical device, respectively.

The above constructions of the optical devices of the present invention allow the coupling thereof to the complementary optical devices independently of the position restriction types of the complementary optical devices and even in the case where the complementary optical devices have both the two type position restriction recesses or members, with the result that interchangeability of the optical devices and the complementary optical devices is attained. This is not only convenient to camera manufactures who have traditionally continued production of optical devices using either type of position restriction but also convenient to camera users who have bought optical devices using either type of position restriction.

The above and other objects and features of the present invention will become apparent from the following description of preferred embodiments of the present invention taken in conjunction with the accompanying drawings.

BRIEF DESCRIPTION OF THE DRAWINGS

FIG. 6 is a schematic illustration of the process of attaching and detaching the interchangeable lens with the position restricting recess of the radially inwardly operating type as shown in FIGS. 1(a) and 3, to the camera body of the construction shown in FIG. 5; and in the Figure, (a) (b) (c) and (d) are plane views and (e)

(f) (g) and (h) are front elevational views, with (a) and (e) showing the camera body with no lens attached thereto, (b) and (f) showing the condition wherein the interchangeable lens is to be attached to the camera body, (c) and (g) showing the attachment completion condition wherein the interchangeable lens has been attached to the camera body, and (d) and (h) showing the condition wherein a position restriction release button is being depressed;

DESCRIPTION OF PREFERRED EMBODIMENTS

Figure 1A:
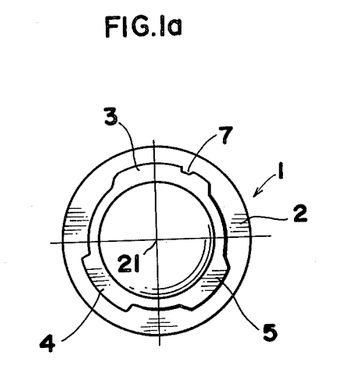
FIG. 1(a) is a schematic rear elevational view of an interchangeable lens with a position restricting recess of the radially inwardly operating type.
Figure 1B:
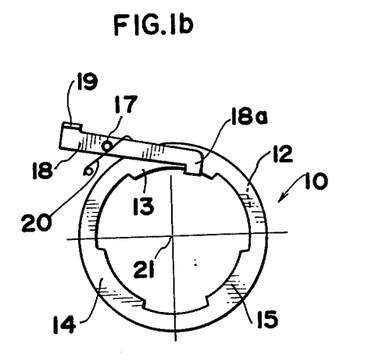
FIG. 1(b) is a schematic rear elevational view of a mount seat of a camera body with a position restricting member of the radially inwardly operating type.
Figure 2A:
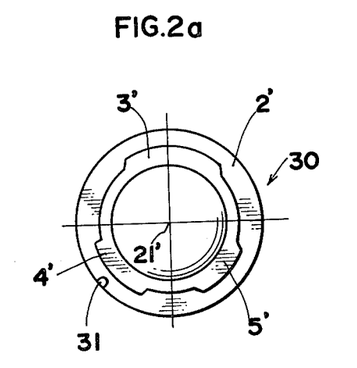
FIG. 2(a) is a schematic rear elevational view of an interchangeable lens with a position restricting recess of the optical axis direction operating type.
Figure 2B:
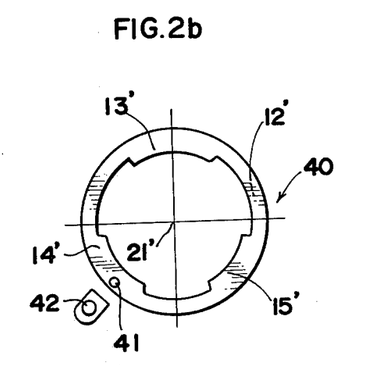
FIG. 2(b) is a schematic rear elevational view of a mount seat of a camera body with a position restricting member of the optical axis direction operating type.
Figure 3:
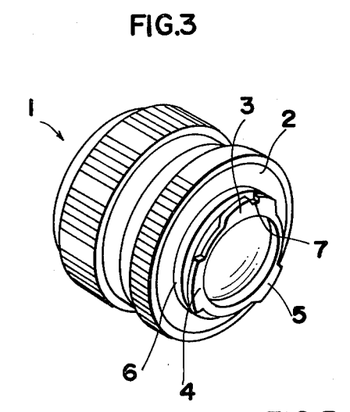
FIG. 3 is a rear perspective view of an interchangeable lens of the radially inwardly operating type.
Figure 4:
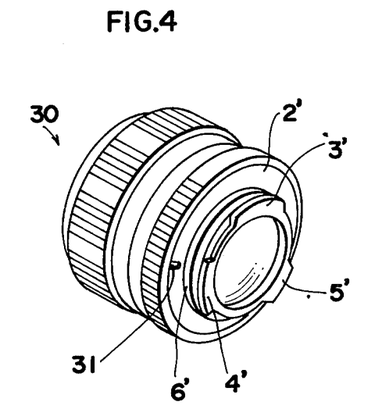
FIG. 4 is a rear perspective view of an interchangeable lens of the optical axis direction operating type.

Preceeding the explanation of the embodiments of the invention, explanation is now given to the conventional mechanisms. FIGS. 1 through 4 show respectively a conventional camera body and conventional interchangeable lens with the position restricting device of the radially inwardly operating type or the optical axis direction operating type, with FIGS. 1(a), 1(b) and 3 showing the former type and FIGS. 2(a), 2(b) and 4 showing the latter type. FIGS. 1(a) and 3 are respectively a rear elevational view and a perspective view of the interchangeable lens, while FIGS. 2(a) and 4 are also respectively a rear elevational view and a perspective view of the interchangeable lens.

Mount member 2 of interchangeable lens 1 shown in FIG. 1(a) has formed with three bayonet pawls 3, 4 and 5 projecting radially outward, outer fitting surface 6 and position restricting recess 7 of the radially inwardly operating type.

The reference numeral 10 in FIG. 1(b) denotes a camera body of the same type. Its mount seat 12 which is to be in facial contact with mount member 2 of interchangeable lens 1, has formed with three bayonet pawls 13, 14 and 15 projecting radially inward. With position restricting recess 7 for the radially inwardly operating type position restriction of the mount member 2 of the interchangeable lens, is to be aligned with hook portion 18a formed at one end of lever 18 which is pivotally supported on the camera body by pin 17 and which serves as the position restricting member of the radially inwardly operating type. At the other end of lever 18 is provided position restriction release button 19. Spring 20 always urges lever 18 in the clockwise direction. The optical axis of the objective lens in the barrel is denoted by reference numeral 21.

In order to attach interchangeable lens 1 to camera body 10, mount member 2 of interchangeable lens 1 is inserted into camera body 10 from the front of the body, i.e. from the under side of the drawing, with the interchangeable lens assuming the angular position rotated in the counterclockwise direction by 60° from the position shown in FIG. 1(a) until a rear contact plane of lens 1 comes into contact with a front contact plane of the camera mounting seat. Upon completion of the insertion, exchangeable lens 1 is rotated counterclockwise. With the rotation of the lens, the oblique edge of bayonet pawl 3 at the left side thereof as viewed in the Figure pushes away and lifts hook portion 18a of lever 18. As objective lens 1 is rotated further, hook portion 18a of lever 18 continues to be in sliding engagement with the outer peripheral edge of bayonet pawl 3 until recess 7 comes into alignment with hook portion 18a of lever 18 which serves as the position restricting member, whereon lever 18 rotates clockwise under the force of spring 20 with its hook portion entering recess 7 whereby exchangeable lens 1 is restrained at a right position relative to camera body and its coupling to camera body 10 is attained. This coupling is maintained until position restriction release button 19 is depressed to disengage hook portion 18a of lever 18 from recess 17.

FIG. 2(a), 2(b) and 4 show a conventional camera-to-lens coupling mechanism with the position restricting device of the optical axis direction operating type. In the Figures, the same but prime numbers are used for the same or like elements as those of the above described embodiment of the radially inwardly operating type.

Mount member 2' exchangeable lens 30 is formed with a U-shaped recess 31 for position restriction of the optical axis direction operating type.

On the other hand, pin 41 which serves as the position restricting member of the optical axis operating type, projects from mount seat 12' of camera body 40 towards the under side of the drawing of FIG. 2(b) under the biasing force of a spring (not shown). Pin 41 is interlocked by an interlocking member (not shown) with position restriction release button 42 to move integrally therewith.

In order to attach interchangeable lens 30 to camera body, mount member 2' of interchangeable lens 30, assuming the angular position rotated by 60° from the position shown in FIG. 2(a), is inserted into camera body 40 from the under side of the drawing in FIG. 2(b). When mount member 2' is inserted into camera body to some extent, the rear surface of mount member 2' of lens 30 engages pin 41 which projects from mount seat 12' of camera body. Then, interchangeable lens 30 should be forced further towards camera body against the biasing force acting on pin 41 until opposing mount surfaces of mount member 2' and mount seat 12' come into contact with each other, whereupon interchangeable lens 30 is rotated counterclockwise with the contact being maintained. When position restricting pin 41 comes into alignment with position restricting recess 31, pin 41 enters recess 31 by the force of the spring (not shown) to restrict body 40 and interchangeable lens 30 at a right relative positions, thereby attaining the coupling of interchangeable lens 30 to camera body 40.

As described above, the conventional position restricting devices for bayonet mount mechanisms are classified into a radially inwardly operating type and an optical axis direction operating type so that a camera body and an interchangeable lens of the same type can be coupled to each other with their relative position being restricted rightly, whereas a camera body and interchangeable lens of the different types cannot be coupled with rightly restricted relative positional relationship.

Embodiments of the present invention will now be described with reference to FIGS. 5 to 10, wherein the same but double prime numbers are used for the same or functionally same elements as those shown in FIG. 1 through 4.

Figure 5:
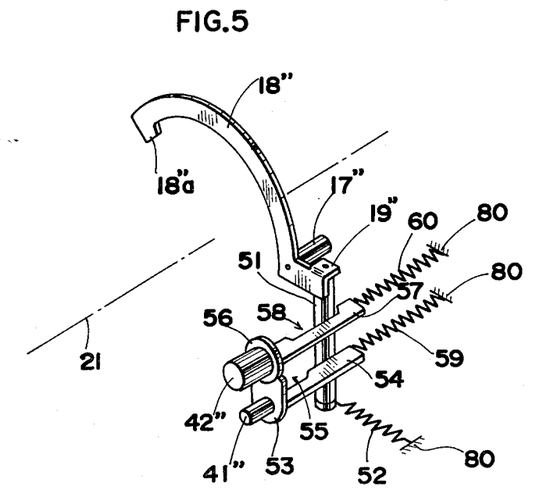
FIG. 5 is a perspective view showing an internal construction of a camera body according to an embodiment of the present invention.

With reference to FIG. 5 showing the construction of camera body 80, lever 18" having fixed thereto detection member 51 is rotatably supported by pin 17" and biased counterclockwise by tension spring 52 which is connected to detection member 51. At the end of lever 18" opposite to the end where detection member 51 is fixed is formed hook end 18" a which can be received by a position restricting recess of the radially inwardly operating type and which is formed on any one of three bayonet pawls of an interchangeable lens.

Position restricting member 41" for optical axial direction operating type has formed with flange 53 and cam plate 54 which has cam 55 integrally therewith. Position restriction release member 42" has formed with flange 56 and cam plate 57 which has cam 58. The above mentioned members 41" and 42" are respectively urged to the left as viewed in the Figure by compression springs 59 and 60 compressed between each member and camera body 80 such that flanges 53 and 56 are brought into contact with the rear surface of mount seat 12" of the camera body. Member 41" extends through mount seat 12" of camera body 80 and can be received by a position restriction recess for optical axis direction operating type restriction on the mount member of an interchangeable lens.

Referring to FIG. 6, explanation will be given about process of coupling camera body 80 with interchangeable lens 1 which is of the type shown in FIG. 1(a) and 3 and which has radially inwardly operating type position restricting recess 7 on bayonet pawl 3 of mount member 2. For the convenience of illustration and understanding of the relationship between detection member 51 and cam plates 54 and 57, (a) (b) (c) and (d) of FIG. 6 show cam plates 54 and 57 as laterally shifted from each other with detection member 51 shown as two respectively opposing cam 54 and 57 although the cams are actually vertically aligned with each other with a single detection member 51 opposing the cams.

Figure 6A:
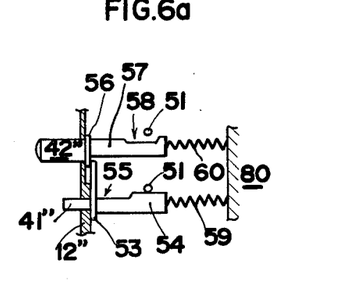
Figure 6B:
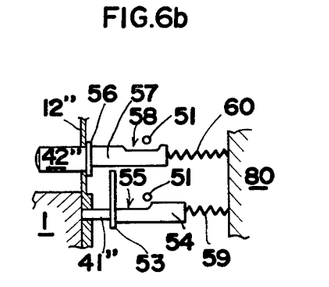
Figure 6C:
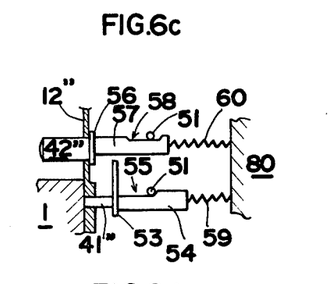
Figure 6D:
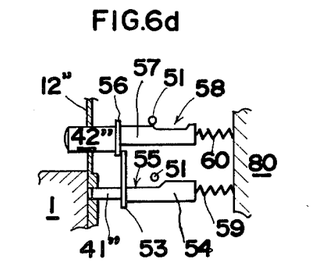
Figure 6E:
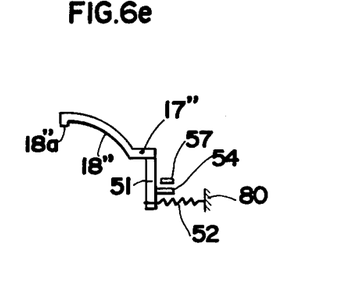
Figure 6F:
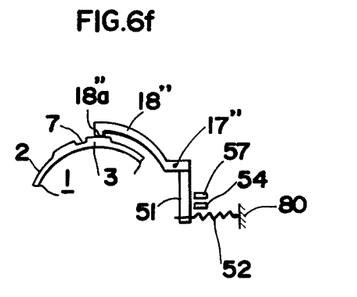

When interchangeable lens 1 is not coupled to camera body 80, the latter assumes the condition shown in FIGS. 6(a) and 6(e). At that condition, optical axis direction operating type position restricting member 41" and position restriction release button 42" are urged to their leftward extreme by compression springs 59 and 60 to bring their flanges 53 and 56 into contact with the rear surface of mount seat 12", whereas detection member 51 is engaged by the raised portion of cam 55 of cam plate 54 and pushed thereby against the force of spring 52 so that lever 18" is rotated clockwise with its hook portion 18"a for radially inwardly operating type restriction being held at its upper lifted position as shown in FIG. 6(e) although detection member 51 opposes to the recessed portion of cam 58 and does not engage cam plate 57.

Figure 6G:
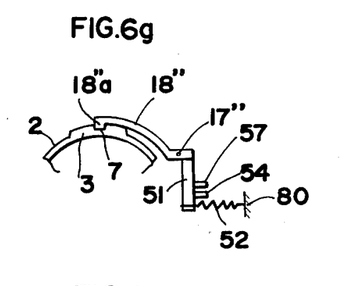

When interchangeable lens 1 is inserted with its mount member into the camera body, member 41 is pushed back as shown in FIG. 6(b) and detection member 51 comes into alignment with the recessed portion of cam 55 of cam plate 54. At this time, however, hook end 18"a has not reached recess 7 and still engages the outer peripheral edge of bayonet pawl 3. When interchangeable lens 1 is rotated further, position restricting recess 7 comes into alignment with hook portion 18"a which enters recess 7 as shown in FIG. 6(g) whereby coupling of interchangeable lens 1 is coupled to camera body 80 at a desired restrained position.

Figure 6H:
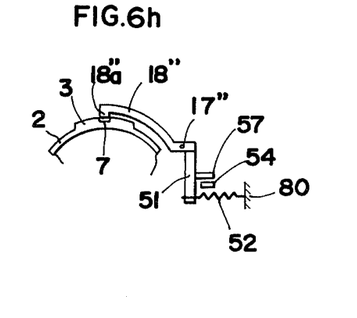

In order to detach interchangeable lens 1 from camera body 80, position restriction release button 42" is depressed to the right as viewed in the Figure. Then, flange 53 is pushed further to the right by flange 56, so that detection member 51 is moved by the lefthand raised portion of cam 58 of cam plate 57. As the result, lever 18" is rotated clockwise against the force of spring 52 with hook portion 18"a retracting from recess 7 so that hook portion 18"a is disengaged from recess 7 as shown in FIG. 6(d) and 6(h). Then, by rotating interchangeable lens 1 in the opposite direction to that mentioned above, interchangeable lens 1 can be removed from camera body 80.

Then, with reference to FIG. 7, explanation will be made about the process wherein camera body 80 is coupled with interchangeable lens 30 which has on its mount member 2' optical axis direction operating type position restricting recess 31 and which is shown in FIGS. 2(a) and 4.

Figure 7A:
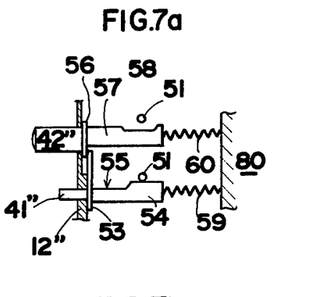
FIG. 7 is a schematic illustration of the process of attaching and detaching the interchangeable lens with the position restricting member of the optical axis direction operating type as shown in FIGS. 2(a) and 4, to the camera body of the construction shown in FIG. 5; and in the Figure, (a) (b) (c) and (d) are plane views and (e) (f) (g) and (h) are front elevational views, with (a) and (e) showing the body with no lens attached thereto, (b) and (f) showing the condition wherein the interchangeable lens is to be attached to the camera body, (c) and (g) showing the attachment completion condition wherein the interchangeable lens has been attached to the camera body, and (d) and (h) showing the condition wherein position restriction release button is being depressed down.
Figure 7B:
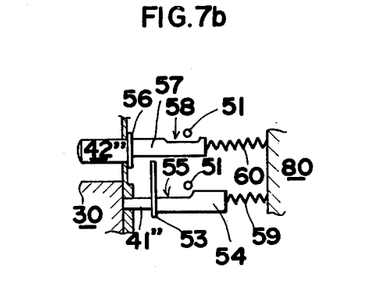
Figure 7C:
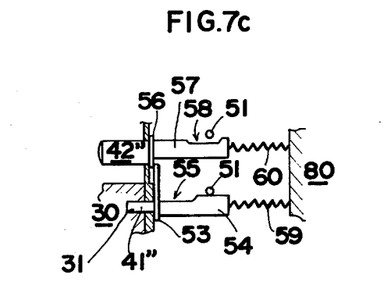
Figure 7D:
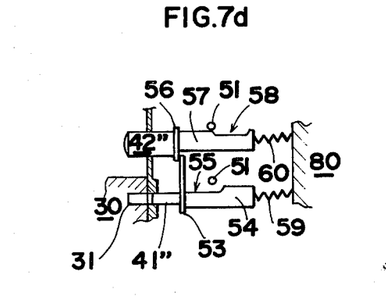
Figure 7E:
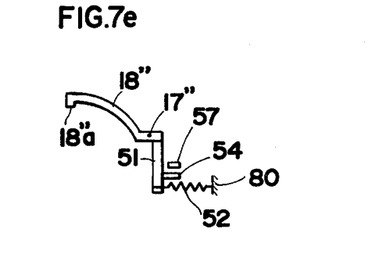
Figure 7F:
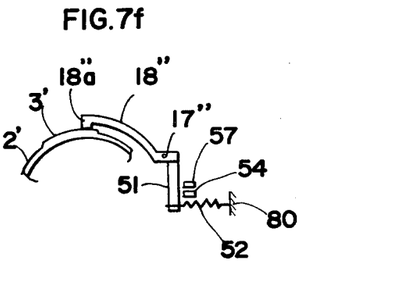
Figure 7G:
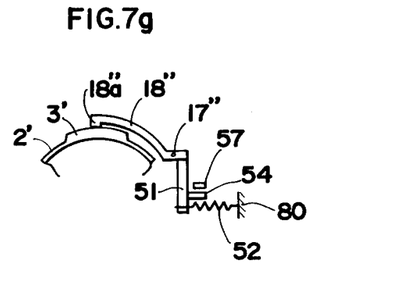

FIG. 7(a) and 7(e) shows the condition of camera body 80 before interchangeable lens 30 is attached thereto, and the Figures are the same as FIG. 6(a) and 6(e). When interchangeable lens 30 is moved axially towards camera body 80, mount member 2' of interchangeable lens comes into close contact with mount seat 12" of camera body 80 with position restriction member 41" for the optical axis direction operating type restriction being pushed by mount member 2' and being moved into camera body 80, i.e. to the right as viewed in the Figure, against the force of spring 59. As interchangeable lens 30 is rotated or turned under that mount member and mount seat contacting condition, hook portion 18"a of lever 18" rides on the outer peripheral edge of bayonet pawl 3', so that lever 18" is rotated clockwise as viewed in FIG. 5 and is held, as shown in FIG. 7(f), at the condition same as that shown in FIG. 7(e). When interchangeable lens 30 is rotated further, its bayonet pawls 3', 4' and 5' come into engagement with corresponding bayonet pawls of camera body 80 whereupon position restricting member 41" for optical axis operating type restriction comes into alignment with recess 31 and enters thereinto to move to the left as viewed in the Figure, i.e. in the direction to project from mount seat 12" as shown in FIG. 7(c). At this point, the coupling of interchangeable lens to camera body 80 is completed. However, even in this coupling completed condition, lever 18 is maintained in the same condition shown in FIG. 7(g) as shown in FIG. 7(e).

When interchangeable lens 30 coupled with camera body is desired to be decoupled therefrom, position restriction release button 42" should be depressed as in the above case. Then, as shown in FIG. 7(d), flange 56 pushes flange 53 to retract position restricting member 41" from recess 31 so that interchangeable lens 30 can be rotated in the opposite direction from that at the time of coupling and be removed from camera body 80. It should be understood that at the condition when release button 42 is depressed, detection member 51 comes into alignment with the recess portion of cam 55 of cam plate 54, but that as hook portion 18"a rides on outer peripheral edge of bayonet pawl 3', lever 18" is held at the initial position as shown in FIG. 7(h).

Figure 8:
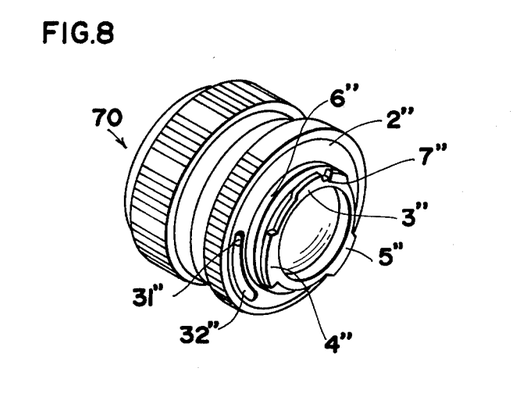
FIG. 8 is a schematic rear perspective view of an interchangeable lens according to an embodiment of the present invention in which the lens is provided with position restricting members of both the radially inwardly operating and optical axis direction operating types.

Meanwhile, from the above description, cam 55 of cam plate 54 in camera body 80 of the embodiment did not perform any function and may be seen as unnecessary. However, such combinations may be possible wherein the camera body has the conventional structure as shown in FIG. 1(b) or FIG. 2(b) while a single interchangeable lens is provided with both position restricting recesses for the radially inwardly operating type restriction and for the optical axis direction operating type restriction. FIG. 8 shows such an interchangeable lens 70 which is provided on bayonet pawl 3" with position restriction recess 7" for the radially inwardly operating type restriction and in shallow circumferential groove 32" with position restricting recess 31" for the optical axis direction operating type restriction. When such an interchangeable lens 70 is coupled with camera body 80 of the present embodiment, it may be desired that either one of position restricting members is operated in priority with the other being left inoperative. Cam 55 of cam plate 54 as well as circumferential groove 32" are provided for such a case. Then, explanation will be made about the process of coupling such interchangeable lens 70 to camera body 80. It is to be noted that camera body 80 of the present embodiment is arranged to give priority to the optical axis direction operating type position restriction over the radially inwardly operating type position restriction.

Figure 9A:
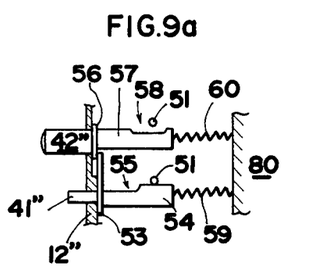
FIG. 9 is a schematic illustration of the process of attaching and detaching the interchangeable lens shown in FIG. 8 to the camera with the construction shown in FIG. 5, and in the Figure (a) (b) (c) and (d) are plane views and (e) (f) (g) and (h) are front elevational views, with (a) and (e) showing the camera body with no lens attached thereto, (b) and (f) showing the condition wherein the interchangeable lens are to be attached to the camera body, (c) and (g) showing the attachment completion condition wherein the interchangeable lens has been attached to the camera body, and (e) and (h) showing the condition wherein position restriction release button is being depressed.
Figure 9B:
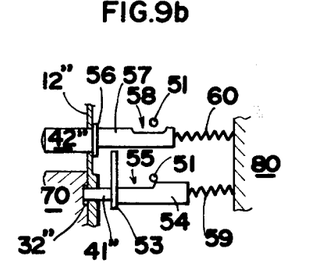
Figure 9C:
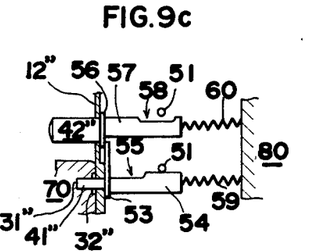
Figure 9D:
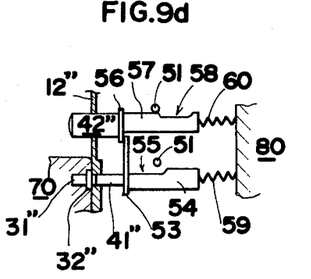
Figure 9E:
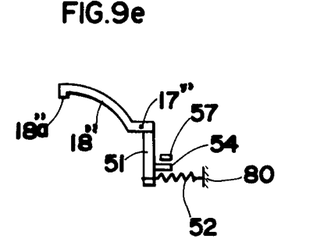
Figure 9F:
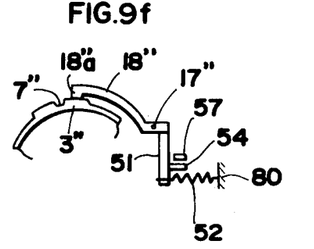
Figure 9G:
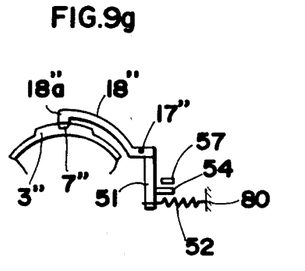

FIG. 9(a) and 9(e) show the camera body condition before interchangeable lens 70 is attached thereto, and are the same as FIGS. 6(a) and 6(e) and FIGS. 7(a) and 7(e). FIG. 9(b) and 9(d) show the condition wherein interchangeable lens 70 has been moved along its optical axis to bring its mount member 2" into close engagement with mount seat 12" and is being rotated with position restricting member 41" for the optical axis direction operating type restriction abutting against the bottom wall of circumferential groove 32". When interchangeable lens 70 is rotated further from the position of FIGS. 9(b) and 9(f), position restricting member 41" for optical axis operating type restriction enters position restricting recess for optical axis operating type restriction 31" to thereby complete the coupling of interchangeable lens to camera body 80 as shown in FIG. 9(c). At this time, if the raised portion of cam 55 of cam plate 54 is not provided, lever 18" rotates counterclockwise under the action of spring 52 and its hook portion 18"a tends to enter radially inwardly operating type position restricting recess 7", since detection member 51 is in alignment with recessed portion of cam 58 of cam plate 57. However, in the present embodiment, as detection member 51 is engaged by the raised portion of cam 55 of cam plate 54 in the condition shown in FIG. 9(c), hook portion 18"a of lever 18" does not enter recess 7" of bayonet pawl 3" as seen in FIG. 9(g). Accordingly, the optical axis direction operating type position restriction is given priority over radially inwardly operating type position restriction. Additionally, if interchangeable lens 70" is not provided with circumferential groove 32", accuracy cannot be ensured and it is likely to occur that before member 41" enter recess 31", hook portion 18"a of lever 18" comes into alignment with recess 7" of bayonet pawl 3" and the position restriction of the radially inwardly operating type is effected inadvertently. On the contrary, as the present invention is provided with circumferential groove 32", detection member 51 is lifted by cam plate 54 during the attachment of interchangeable lens 70 as seen in FIG. 9(b), so that lever 18" is held at the position rotated counterclockwise as viewed in FIG. 5 causing no such a problem. It should be noted that circumferential groove 32" of interchangeable lens 70 also serves to prevent the formation of scratch marks on the mount surface of mount member 2" due to its frictional sliding engagement with member 41" and thereby maintain the beauty of its appearance.

Figure 7H:
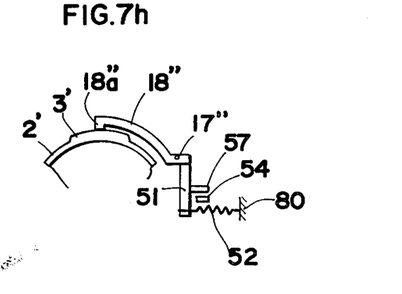
Figure 9H:
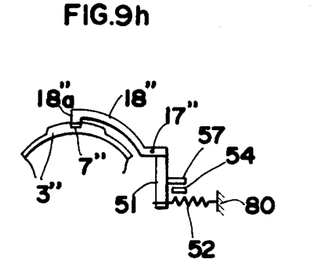

FIGS. 9(d) and 9(h) shows the condition where interchangeable lens 70 is being removed from camera body 80, and are same as FIG. 7(d) and 7(h).

It should be understood that the optical axis operating type position restriction is given a priority over the radially inwardly operating type position restriction because more accurate position restriction can generally be attained by the optical axis direction operating type position restriction rather than the radially inwardly operating type position restriction, but that the priority may be given to either of the types depending on the convenience of designing. For example, as the mechanical interconnection between camera body 80 and interchangeable lens 70, e.g. for the purpose of automatic diaphragm or focus adjustment or of mutual transmission of information, can be made accurate when the interconnection is close to the position of the position restriction, it is desirable to give priority to the radially inwardly operating type position restriction over the optical axis direction operating type when the mechanical interconnection is designed to be made close to or at the position of the former type position restriction.

Figure 10:
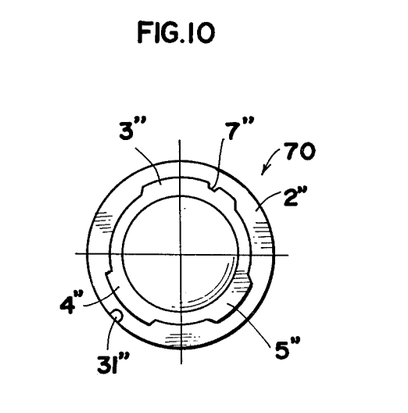
FIG. 10 is a rear elevational view of an interchangeable lens according to another embodiment of the present invention.

FIG. 10 shows interchangeable lens 70' which is adaptable to the conventional camera body of any type. With reference to FIG. 10, mount member 2" has formed with three bayonet pawls 3", 4" and 5" as does the conventional interchangeable lens. Bayonet pawl 3" is formed with position restriction recess 7" for the radially inwardly operating type restriction whereas mount member 2" has formed on its mount surface with U-shaped position restricting recess 31" for the optical axis direction operating type restriction. When interchangeable lens 70' with the position restriction construction as described above is attached to conventional camera body 10 shown in FIG. 1(b), hook portion 18a of lever 18 engages into recess 7" to effect the position restriction of the radially inwardly operating type. When interchangeable lens 70' is attached to conventional camera body 40 as shown in FIG. 2(b), pin 41 engages into recess 31" to effect the position restriction of the optical axis direction operating type.

It should be understood that interchangeable lens 70' shown in FIG. 10 is adaptable for a camera body which is provided with both types of position restriction structures, any one of which can be used selectively or together for reducing the play in the rotational direction in the coupling.

Description has been made about some preferred embodiment with reference to the drawings. However, the present invention should not be restricted to them. For example, although in the embodiment, camera bodies and interchangeable lenses are referred to as the complementary optical devices to be coupled with each other, the present invention is applicable to various combinations of optical devices, such as of an interchangeable lens and a converter lens, a converter lens and a camera body, and so on, in so far as they are coupled through a bayonet mount mechanism. Further, the optical device to which the present invention is applied should include an instrument or device that has not optical element therein, such as adapted for interconnecting optical devices having bayonet mounts of different diameters, and an extension or intermediate ring and a bellows device for close-up photography.

In the coupling of the camera body shown in FIG. 5 and the interchangeable lens shown in FIG. 8, cam 55 and circumferential groove 32" are provided for giving priority to the optical axis direction operating type position restriction over the radially inwardly operating type position restriction. Instead however, the camera body can be constructed to give priority to either type by modifying the relative angular positional relationship between hook portion 18"a of position restriction member 18" for the radially inwardly operating type restriction and position restriction member 41" of the optical axis direction operating type restriction from a normal relative angular position exactly corresponding to that of recesses 7" and 31" of the interchangeable lens. Similarly, the interchangeable lens can be constructed to give priority to either type by modifying the relative angular positional relationship between recesses 7" and 31" from a normal relative relationship exactly corresponding to that of hook portion 18" and position restriction member 41".

According to the present invention described above, manufacturers or makers can provide a variety of products utilizing the advantages of both type position restrictions, while the users can enjoy the interchangeability between products of any type.

Heretofore, camera manufacturers have traditionally continued production of optical devices using either type of position restriction. Even in the case when it is difficult to design a new optical device in combination with the continued type of position restriction, the present invention enables adoption of the other types of position restriction thereby enabling reasonable designing of optical devices adapted for desired specifications.

Further, the users who have bought the traditional type optical devices can couple the new optical devices with those they have had, without modifying them or without making the latter useless.

I claim:

1. An optical device adapted to be coupled to a complementary optical device by a bayonet mount coupling, said optical device comprising:
    a first position restriction member capable of operating radially inwardly from an inoperative position to an operative position for restricting the angular position of said complementary optical device relative to said optical device;
    a first biasing means for biasing said first position restriction member to its operative position;
    a second position restriction member capable of operating in the direction of the optical axis of said optical device from an inoperative position to an operative position for restricting the angular position of said complementary optical device relative to said optical device;
    a second biasing means for biasing said second position restriction member to its operative position; and
    a position restriction release means arranged to be operated by an external operation to retract said first and second position restriction members to their respective inoperative position for the release of the position restriction achieved.

2. An optical device as set forth in claim 1, wherein said position restriction release means includes a single release button capable of being operated from the exterior of said optical device with said optical device coupled to said complementary optical device.

3. An optical device as set forth in claim 2, further comprising:
    a first cam member integral with said second position restriction member; and
    a detection member integral with said first position restriction member and biased by said first biasing means to contact with said first cam member,
    said first cam member having a configuration which allows movement of said detection member for enabling the operation of said first position restriction member to its operative position only when said cam member is in a position where said second position restriction member is in its inoperative position.

4. An optical device as set forth in claim 3, further comprising:
    a second cam member integral with said release button and pushing said detection member for retracting said first position restriction member from its operative position to its inoperative position in response to an external operation of said release button; and
    an engaging member integral with said release button and engaging said second position restriction member for retracting the same from its operative position to its inoperative position in response to the external operation of said release button.

5. An optical device adapted to be coupled by a bayonet mount coupling to a complementary optical device which includes a first position restriction member capable of operating radially inwardly from an inoperative position to an operative position for restricting the angular position of said optical device relative to said complementary optical device and/or a second position restriction member capable of operating in the direction of the optical axis of said complementary optical device from an inoperative position to an operative position for restricting the angular position of said optical device relative to said complementary optical device, said optical device comprising:
    a first position restriction recess capable of receiving said first position restricting member to allow the operation of the same to its operative position upon the coupling of said optical device to said complementary optical device; and a second position restriction recess capable of receiving said second position restriction member to allow the operation of the same to its operative position upon the coupling of said optical device to said complementary optical device.

6. An optical device as set forth in claim 5, further comprising a mount seat member having a shallow circular groove on a surface thereof, said second position restriction recess is formed on the bottom of said groove.

7. An optical device as set forth in claim 5, wherein said first and second position restriction recesses have a relative angular positional relationship modified from a normal relative angular positional relationship exactly corresponding to the angular positional relationship of said first and second position restriction members on said complementary optical device, so that either the position restriction by said first position restriction member or that by said second position restriction member is given priority over the other upon the coupling of said optical device to said complementary optical device.

8. An optical device adapted to be coupled by a bayonet coupling to a complementary optical device which includes a first position restriction recess on one of radially outwardly projecting bayonet pawls and/or a second position restriction recess on a mount seat member, said optical device comprising:

a first position restriction member capable of operating radially inwardly to enter said first position restriction recess for restriction of the angular position of said complementary optical device relative to said optical device upon the coupling of said optical device to said complementary optical device;

a first biasing means for biasing said first position restriction member radially inwardly for its entering to said first position restriction recess;

a second position restriction member capable of operating in the direction of the optical axis of said optical device to enter said second position restriction recess for restriction of the angular position of said complementary optical device relative to said optical device upon the coupling of said optical device to said complementary optical device;

a second biasing means for biasing said second position restriction member in said direction for its entering to said second position restriction recess; and a position restriction release means arranged to be operated by an external operation to retract said first and second position restriction members from said first and second position restriction recesses respectively.

9. An optical device as set forth in claim 8, wherein said first position restriction member is arranged so as to ride on said one of said bayonet pawls on the way of the coupling of said optical device to said complementary optical device for its operation against the bias of said first biasing means, and wherein said second position restriction member is arranged so as to be pushed by said mount seat member on the way of the coupling of said optical device to said complementary optical device for its operation against the bias of said second biasing means.

10. An optical device as set forth in claim 9, further comprising a mount seat member from which said second position restriction member projects and which is brought into close contact with said mount seat member of said complementary optical device upon the coupling of said optical device to said complementary optical device.

11. An optical device as set forth in claim 8, further comprising a mechanism for giving priority to either the position restriction by the cooperation of said first position restricting member and said first position restriction recess or the position restriction by the cooperation by said second position restriction member and said second position restriction recess over the other upon the coupling of said optical device to said complementary optical device in the case of said complementary optical device including both said first and second position restriction recesses.

12. An optical device as set forth in claim 8, wherein said first and second position restriction members have an angular positional relationship modified from a normal angular positional relationship exactly corresponding to that of said first and second position restriction recesses for giving priority to either the position restriction by the cooperation of said first position restriction member and said first position restriction recess or the position restriction by the cooperation of said second position restriction member and said second position restriction recess over the other in the case of said complementary optical device including both said first and second position restriction recesses.

13. A camera body for alternative use with interchangeable first and second objective lenses having bayonet couplings and having respectively a longitudinal extending first indexing recess and a radially extending second indexing recess; the camera body having a front bayonet coupling complementary to the lens bayonet coupling and being characterized in the provision of a first locking element movable between an advanced position for releasably engaging the first indexing recess of a first objective lens bayonet coupled to the camera body and a retracted recess disengaged position and biased to its advanced position, a second locking element movable between an advanced position for releasably engaging the second recess of a second objective lens bayonet coupled to said body member and a retracted recess disengaged position and biased toward its advanced position and externally accessible manually operable means for retracting said locking elements.

14. The camera body of claim 13 for use with an objective lens having both said first and second indexing recesses relatively angularly spaced, said locking elements being similarly angularly spaced.

* * * * *